(No Model.)
J. DEMAREST.
URINAL.
No. 469,009. Patented Feb. 16, 1892.
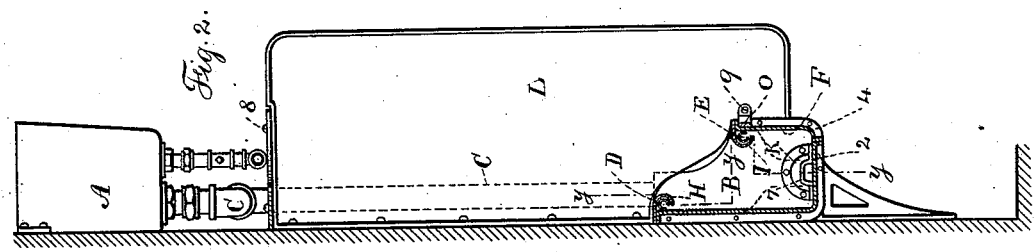
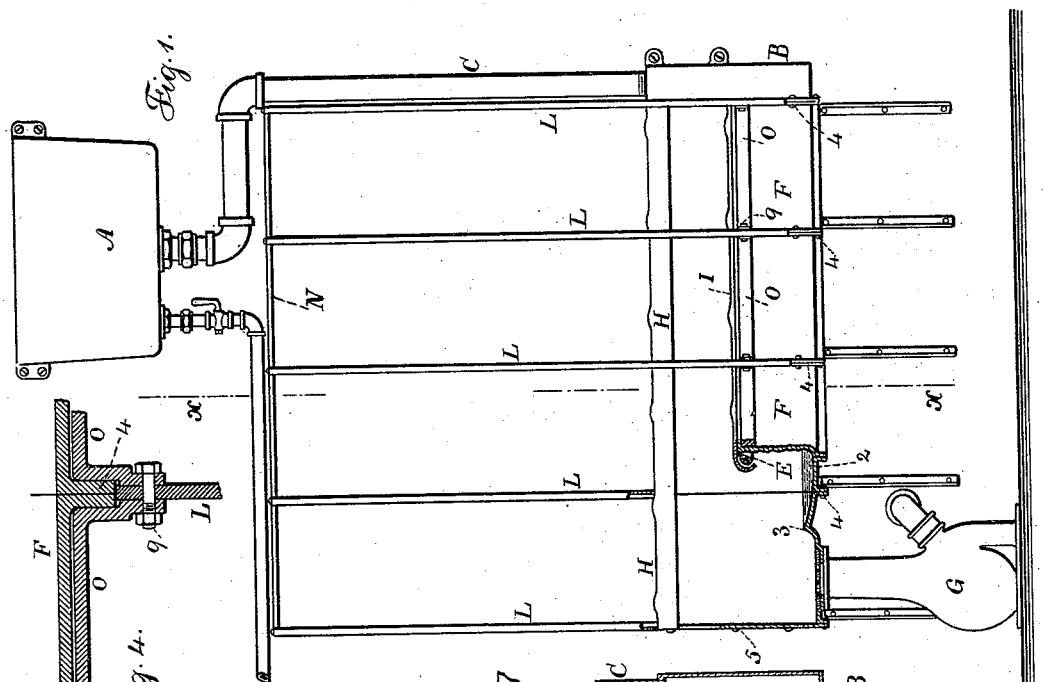
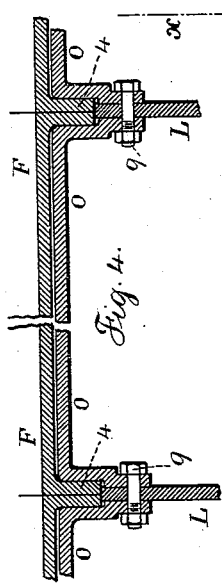
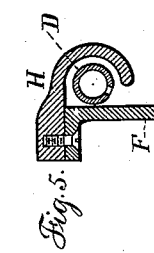
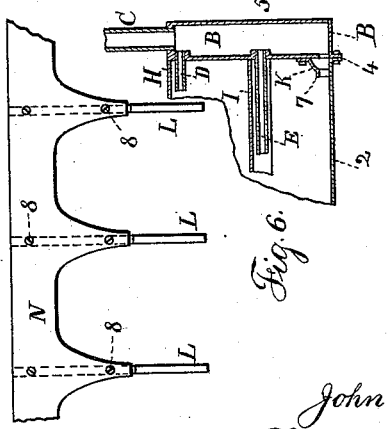
Witnesses:
J. Staib
Chas. H. Smith
Inventor:
John Demarest
per Lemuel W. Serrell
Atty

United States Patent Office.

JOHN DEMAREST, OF NEW YORK, N. Y., ASSIGNOR TO THE J. L. MOTT IRON WORKS, OF SAME PLACE.

URINAL.

SPECIFICATION forming part of Letters Patent No. 469,009, dated February 16, 1892.

Application filed September 26, 1891. Serial No. 406,885. (No model.)

*To all whom it may concern:*

Be it known that I, JOHN DEMAREST, a citizen of the United States, residing at the city and State of New York, have invented an Improvement in Urinals, of which the following is a specification.

In Letters Patent No. 381,221, granted to me April 17, 1888, a trough or container is represented beneath the seats and a cistern from which the water is supplied automatically to one end of the trough or container.

This invention is an improvement upon and a modification of the device represented in the aforesaid patent, whereby the urinal is rendered more cleanly, and it is adapted to be extended to any desired length.

In the drawings, Figure 1 is an elevation representing four divisions of a urinal. Fig. 2 is a vertical section at the line x x. Fig. 3 is a plan view at the top part of the partitions. Fig. 4 is a horizontal section in larger size, showing the connecting-bars for the lower ends of the partitions. Fig. 5 is a section in larger size, representing one of the screws for uniting the shield to the edge of the trough; and Fig. 6 is a section of the end chamber at the line y y, Fig. 2.

The reservoir A and the flushing-pipe C may be of any suitable character, preferably similar to those in the aforesaid patent, and this flushing-pipe C is connected at its lower end to the chamber B, from which pass the jet-pipes D and E, longitudinally of the trough F. This trough F is of porcelain-lined cast-iron and is U-shaped, the back being higher than the front, and the bottom 2 of the trough is flat, or nearly so, in order that the water may lie uniformly, or nearly so, upon the bottom of the trough, and with this object in view there is a dam 3 near the delivery end of the trough.

The trough is made in sections. Preferably each section is of a length adapted to two divisions, and the sections are uniform in shape, so that any desired number of sections can be put together to extend the urinal any required distance. At the ends of each section of the trough there are flanges 4 standing outwardly, so that the ends of the sections of the trough come together square and are secured by bolts passing through the flanges 4, and the joints are rendered tight by suitable packing, such as putty; and it is to be understood that the end section having the dam 3 is also provided with an end 5, which may be either a plate bolted on or cast with the rest of the section, and there is an opening through this section for the water to pass off to the trap G, which trap may be of any desired character, and it is preferably connected with the trough by bolts, as usual, and at the opposite end of the urinal the chamber B is connected to the end of the trough-section by flanges and bolts, the flanges upon the chamber B corresponding to the flanges upon the trough, so that the connection of the chamber can be made to any one section of the trough.

The jet-pipes D and E are preferably of sufficient length to extend all along the urinal, the pipe D being at the upper edge of the back of the urinal and the pipe E behind the front edge of the trough, and in order to protect these pipes from injury or rust the shields H and I are made use of. These shields are in the form of overhanging flanges curved downwardly so as to partially surround the respective jet-pipes, and these shields are enameled or made with vitrified surfaces, so as to prevent them becoming rusty, and they are screwed onto the flanged edges of the trough, as represented in Fig. 5, the screws passing up from below. If either the head of the screw or the point were exposed, it would be liable to rust and prevent the separation of the parts for repairs. To avoid this, I make the shield thicker at the place where the screw-hole is provided, and the said hole is not bored through. Hence the upper end of the screw is protected, and by reference to Fig. 1 it will be noticed that the thickened portion of the shield for the screw is beveled off in each direction, so as not to increase the weight of the shield unnecessarily.

The jet-pipes D and E are perforated upon their under sides and in such a direction that the jets of water will flow against the interior surfaces of the urinal-trough, and in cases where an automatic flushing-cistern is made use of the entire trough will be thoroughly washed and cleansed each time the water is discharged from the cistern, and to facilitate the proper flushing of the bottom of the trough there is a concentrator K at the lateral opening from the chamber and on the level of the bottom of the trough. This concentrator is made similar to a quarter-globe, with a flange screwed to the vertical face of the chamber B and having a nozzle 7 above the bottom of the trough, the opening being square, or nearly so, and this opening in the nozzle is below the ordinary level of the water in the trough as it is retained by the dam 3, so that when the water issues from this concentrator little or no noise is made, and there is a sufficient rush of water along the bottom of the trough to carry the contents of such trough over the dam 3 and thoroughly cleanse the urinal.

Difficulty has heretofore been experienced in so supporting the partitions or divisions that they can be easily removed for repairs and in constructing such partitions so that they will not be injured or become rusty, and to obviate these difficulties I provide the partitions L, of cast-iron, having a ribbed or molded edge, and they rest upon the top of the upper shield H, and there is a bracket-plate N, which may be connected at its back edge with the wall and rests upon the top edges of the partitions L, and this bracket-plate is provided with tongues or projections extending out over the upper edges of the partitions L and bolted to the same at 8, so that these partitions are not only supported at the back, but lateral motion is also prevented by the tongues or projections of the bracket-plate N, and along in front of the trough there are tie-bars O extending from one partition L to the next and close along beneath the top flange at the front of the trough, and these tie-bars are provided with angle ends or flanges through which the bolts 9 pass, which also go through the lower parts of the partitions and firmly support these in place, and in consequence of the partitions being in line with the flanges 4, that join the sections of the trough F, these tie-bars O are adjacent to the flanges, and end motion to the tie-bars is prevented by such flanges, as illustrated in Fig. 4.

I claim as my invention—

1. The combination, in a urinal, of a trough made in sections, with end flanges bolted together, the back of the urinal being higher than the front, an end section having a dam in the bottom of the trough and a supply-chamber at the other end of the trough, with a flushing-opening, and the water-pipes passing along the urinal and perforated and opening into such supply-chamber, substantially as set forth.

2. The combination, with the trough-sections having end flanges and bolts, of perforated water-pipes passing along the trough within the back and front edges thereof, shields connected with the trough and partially surrounding the water-supply pipes, and an end chamber into which such pipes open and to which the water is supplied, substantially as set forth.

3. The combination, with the trough F, made in sections and having end flanges bolted together, of the shields H and I, having enameled surfaces and projecting inwardly and downwardly, and the screws passing up into the shields to connect them with the trough, substantially as set forth.

4. The combination, with the trough made in sections and having end flanges and bolts to connect them together, of a water-supplying chamber at one end of the trough, a dam and escape-pipe at the other end of the trough, pipes leading from the water-supply chamber along the inner edges of the trough and perforated for directing the jets of water upon the inner surfaces of the trough, and shields bolted at the edges of the trough and partially inclosing the water-supply pipes, substantially as set forth.

5. The combination, with the trough made in sections, with end flanges bolted together, of cast-metal partitions projecting across the trough, a bracket-plate over the upper edges of the partitions, bolts for connecting the partitions and bracket-plate, and fastenings for securing the parts to the wall, substantially as set forth.

6. The combination, with a trough made in sections and bolted together, of partitions above the trough, the tie-bars O in front of the trough and below its flanged upper edge, and bolts for connecting the tie-bars and the partitions, substantially as set forth.

Signed by me this 7th day of August, A. D. 1891.

JOHN DEMAREST.

Witnesses:
JOHN REID,
MAX GOEBEL.